United States Patent
Ma

(10) Patent No.: US 10,042,960 B2
(45) Date of Patent: Aug. 7, 2018

(54) TARGET TRACKING SYSTEM

(71) Applicant: National Technology & Engineering Solutions of Sandia, LLC, Albuquerque, NM (US)

(72) Inventor: Tian J. Ma, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 463 days.

(21) Appl. No.: 14/662,666

(22) Filed: Mar. 19, 2015

(65) Prior Publication Data
US 2016/0063135 A1 Mar. 3, 2016

Related U.S. Application Data

(60) Provisional application No. 62/042,353, filed on Aug. 27, 2014.

(51) Int. Cl.
G06F 17/30 (2006.01)
(52) U.S. Cl.
CPC .. G06F 17/30961 (2013.01); G06F 17/30967 (2013.01)
(58) Field of Classification Search
CPC .............. G06F 17/30961; G06F 17/30967
USPC ..................................... 707/748
See application file for complete search history.

(56) References Cited

U.S. PATENT DOCUMENTS 5,379,044 A * 1/1995 Carlson et al. ................ 342/90
5,765,166 A * 6/1998 Gotfried et al. .............. 707/737

OTHER PUBLICATIONS

Arslan Basharat et al., Real-time Multi-Target Tracking at 210 Megapixels/second in Wide Area Motion Imagery, IEEE, 2014, 839-846.*
Blackman, "Multiple Hypothesis Tracking for Multiple Target Tracking," A&E Systems Magazine, vol. 19, No. 1, Part 2: Tutorials, Jan. 2004, pp. 5-18.
Rijavec et al., "Data association problems posed as multidimensional assignment problems: problem formulation," Signal and Data Processing of Small Targets, SPIE vol. 1954, Apr. 1993, pp. 552-563.

* cited by examiner

*Primary Examiner* — Jean B Fleurantin
(74) *Attorney, Agent, or Firm* — Yee & Associates, P.C.; Samantha Updegraff

(57) ABSTRACT

Methods and apparatuses for identifying a track for a target are disclosed herein. In a general embodiment, trees for targets are identified. Each tree in the trees includes observations that are connected to each other by branches and each observation has a score. A selected track in a tree is identified within the trees with an observation having a highest score. A group of branches is added to the selected track from other trees other than the tree having the selected track to form the track for a target, enabling reducing processing resources used to identify the track.

17 Claims, 15 Drawing Sheets

```
// The following algorithm identifies a set of tracks for each group of trees:                                    2300

For each group of trees  2304
{ <start of loop A>
    Mark the group of trees as visited;  2306

Set the number of tracks for this group of trees to 1;   // the number of tracks for each group of trees    2308
    Mark the trees in this group of trees as not visited;
    Mark each sequence of observations in these trees as not visited;

While number of tracks < some maximum number  2310
    { <start of loop B>
        // *** In this example, the maximum number is a limit to the number of tracks that may be
        // detected in each group of trees.

While at least one tree in the group of trees has a sequence of observations that has not been visited  2312
        { <start of loop C>
            While at least one tree in the group of trees has not been visited  2314
            { <start of loop D>
                Choose a tree (from highest to lowest) that has not been visited in this group of trees  2316 identify a sequence of observations in this tree that  2318
                    has not been visited, has the highest score, and is compatible with track[number of tracks];

// track[] is a set of tracks being generated
                            // track[number of tracks] is the track being generated in this iteration of loop B.

if the sequence of observations is identified  2320
                    add the identified sequence of observations to track[number of tracks], and
                    mark the sequence of observations as visited;

Mark the tree as visited;  2322

} // If all trees are marked as visited continue, otherwise go back to start of loop D.

When all trees are marked as visited,  2324
                mark as not visited any trees in this group of trees that have a sequence of observations that has not been visited yet;

} // If all trees are marked as visited continue, otherwise go back start of loop C.

increment the number of tracks by one  2326

} // If the number of tracks >= the maximum number continue, otherwise go back start of loop B.  2328

} // If each group of trees has been visited continue, otherwise go back start of loop A  2330
```

FIG. 23

TARGET TRACKING SYSTEM

RELATED APPLICATION

This application claims the benefit of U.S. Provisional Patent Application Ser. No. 62/042,353, filed Aug. 27, 2014, and entitled "Advanced Near-Real-Time Multiple Hypothesis Tracking Using Score-Based Priority Hypothesis Formation."

STATEMENT OF GOVERNMENTAL INTEREST

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved target tracking system and, in particular, to a method and apparatus for identifying tracks for targets. Still more particularly, the present disclosure relates to a method and apparatus for identifying tracks from detections of the targets organized into trees.

2. Brief Background of the Invention

Tracking targets in real world situations can be a challenging problem. Real world situations may require tracking targets in real-time or near real-time. For example, one approach for tracking targets involves using a multiple hypothesis tracking (MHT) process. This type of tracking is used to track multiple targets. A multiple hypothesis tracking process generates trees that represent hypotheses for targets that are detected. The hypotheses generated are potential tracks for the targets.

The multiple hypothesis tracking process provides a desired level of accuracy compared to other tracking processes. However, the multiple hypothesis tracking process is complex and resource intensive. For example, the number of hypotheses generated can increase exponentially. One of the time-consuming steps in the multiple hypothesis tracking process is the formation of hypotheses.

One approach for reducing the time and resources needed to form hypotheses includes using a multi-dimensional assignment involving a Langrangian-relaxation method. Using this approach may result in a process that is more computationally feasible. This approach, however, provides a good, but not the most desired, solution for identifying tracks for targets.

Even with this approach, identifying tracks in near real-time situations may still use more resources than desired, or more resources than may be available for multiple hypothesis tracking. As a result, using multiple hypothesis tracking processes to track targets in real-time or near real-time situations in the real world may be more challenging than desired.

Therefore, it would be desirable to have a method and apparatus that take into account at least some of the issues discussed above, as well as other possible issues. For example, it would be desirable to solve the issue of tracking objects using multiple hypothesis tracking processes in real world situations.

BRIEF SUMMARY OF THE INVENTION

Methods and apparatuses for identifying a track for a target are disclosed herein. In a general embodiment, the present disclosure provides a method for identifying a track for a target. Trees for targets are identified. Each tree in the trees includes observations that are connected to each other by branches and each observation has a score. A selected track in a tree is identified within the trees with an observation having a highest score. A group of branches is added to the selected track from other trees other than the tree having the selected track to form the track for a target, enabling reducing processing resources used to identify the track.

Another embodiment of the present disclosure provides an apparatus comprising a track generation system. The track generation system identifies trees for targets. Each tree in the trees includes observations that are connected to each other by branches and each observation has a score. A selected track is identified in a tree within the trees with an observation having a highest score. A group of branches is added to the selected track from other trees other than the tree having the selected track to form the track for the target, enabling reducing processing resources used to identify the track.

Yet another embodiment of the present disclosure provides a tracking system comprising a tree generator, a sorter, and a track generator. The tree generator generates trees from observations. Each tree in the trees includes observations that are connected to each other by branches. The sorter receives the trees from the tree generator, sorts the trees based on scores for the observations, and sorts the branches in the trees based on the score for the observations. The track generator receives the sorted trees, identifies a selected track in a tree within the sorted trees with an observation having a highest score, and adds a group of branches to the selected track from other sorted trees other than the tree having the selected track to form a track for a target, enabling reducing processing resources used to identify the track.

The features and functions can be achieved independently in various embodiments of the present disclosure or may be combined in yet other embodiments in which further details can be seen with reference to the following description and drawings.

BRIEF DESCRIPTION OF THE DRAWINGS

FIG. 23 is an illustration of pseudo code for identifying a set of tracks in accordance with an illustrative embodiment.

DETAILED DESCRIPTION

The illustrative embodiments recognize and take into account one or more different considerations. For example, the illustrative embodiments recognize and take into account that current processes using multiple hypothesis tracking use more resources than desired or than may be available to track targets. The illustrative embodiments recognize and take into account that the complexity of generating hypotheses for tracking targets account for a large amount of resources used in processes of multiple hypothesis tracking. The illustrative embodiments recognize and take into account that reducing the complexity in generating hypotheses may allow for tracking objects in real world situations with a more desirable level of resource use.

The illustrative embodiments provide a method and apparatus for identifying tracks for targets. These tracks are the potential tracks that the targets may travel on that form the hypotheses for target tracking. In one illustrative example, a method is present for identifying a track for a target. Trees for targets are identified. Each tree in the trees includes observations that are connected to each other by branches and each observation has a score. A selected track in a tree is identified within the trees with an observation having a highest score. A group of branches is added to the selected track from other trees other than the tree having the selected track to form the track for the target, enabling reducing processing resources used to identify the track.

Figure 1:
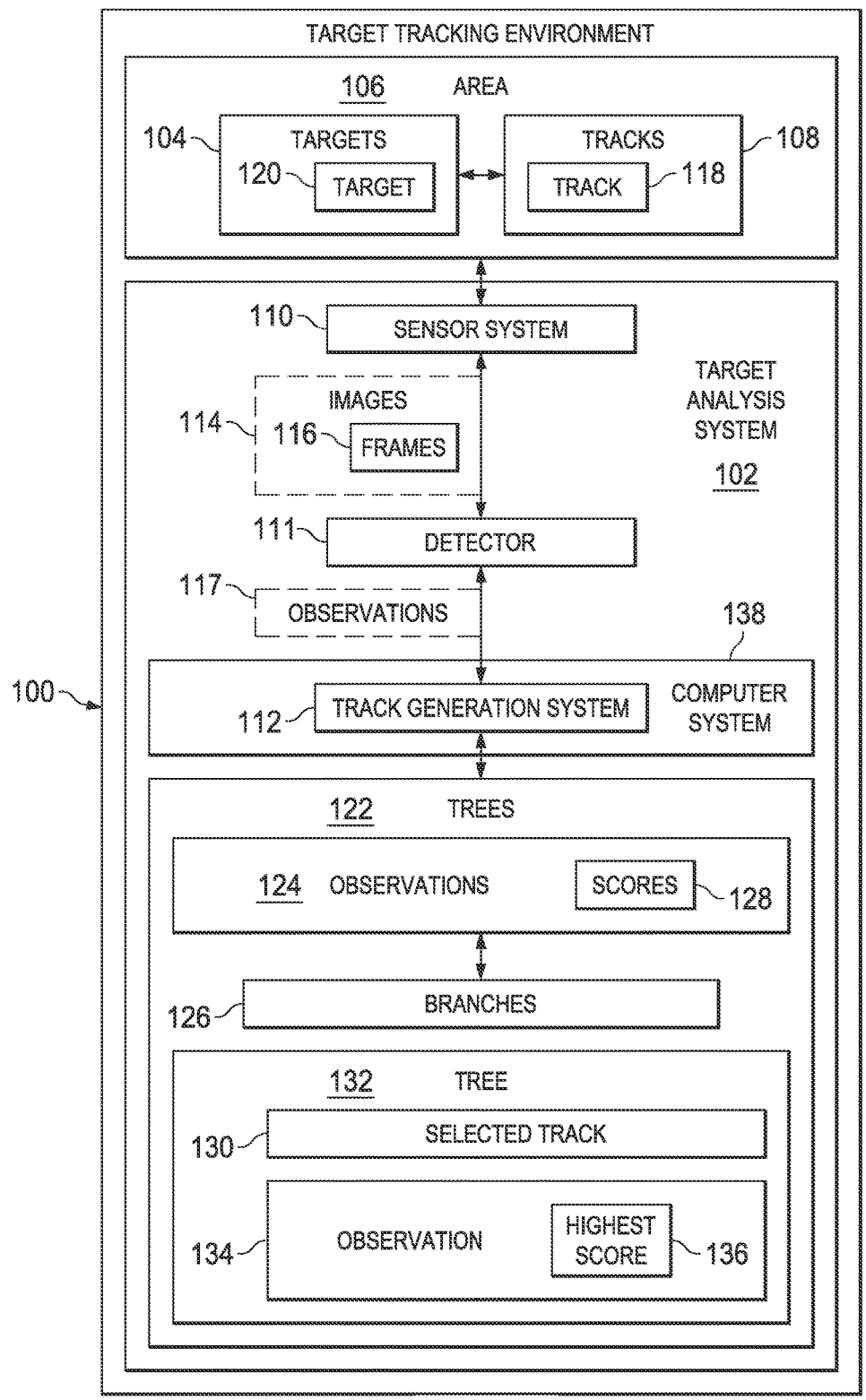
FIG. 1 is an illustration of a block diagram of a target tracking environment in accordance with an illustrative embodiment.

With reference now to the figures, and in particular with reference to FIG. 1, an illustration of a block diagram of a target tracking environment is depicted in accordance with an illustrative embodiment. Target tracking environment 100 includes target analysis system 102, which may track targets 104 in target tracking environment 100.

As depicted, targets 104 are objects for which tracking may be performed. Targets 104 may move in area 106 in target tracking environment 100. Targets 104 may move on tracks 108 in area 106. As depicted, a track is a path on which an object may move.

Targets 104 may take various forms. For example, a target in targets 104 may be selected from one of a person, a car, a truck, an animal, an aircraft, a train, or some other suitable object. Area 106 may be, for example, selected from one of a park, a road, a city block, a meadow, a forest, a stadium, a yard, an atrium, a room, a river, a lake, a portion of the sky, or some other suitable area of interest in which analysis of targets 104 is desired.

In this illustrative example, target analysis system 102 has a number of different components. As used herein, "a number of items" means one more items. For example, "a number of different components" means one or more components. As depicted, target analysis system 102 includes sensor system 110, detector 111, and track generation system 112.

Sensor system 110 is a hardware system and generates images 114 of area 106. Sensor system 110 may include at least one of a camera, a digital camera, a traffic camera, a video camera, an Internet protocol (IP) camera, a pan-tilt-zoom (PTZ) camera, a stereo camera, a visible light camera, a thermographic camera, or some other suitable type of device that generates images 114.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Images 114 are sequential in this particular example. Images 114 may be generated by sensor system 110 on a periodic basis. For example, images 114 may take the form of frames 116 in a video of area 106. In other illustrative examples, images 114 may be still images generated over time.

A "frame" is an image in a video. For example, in a stream of video, a frame for the video is a group of pixels in an image for a particular point in time in the video. As used herein, "a group of," when used with reference to items, means one or more items. For example, a group of pixels means one or more pixels.

Sensor system 110 sends frames 116 to detector 111. Detector 111 identifies observations 117 by processing frames 116. Detector 111 sends observations 117 to track generation system 112. In this illustrative example, detector 111 may be implemented using at least one of software, hardware, or a combination of software and hardware.

Track generation system 112 identifies tracks 108 for targets 104 in this illustrative example. Tracks 108 are identified by processing observations 117.

During operation, track generation system 112 identifies track 118 for target 120. In identifying track 118, track generation system 112 identifies trees 122 for targets 104.

Trees 122 are comprised of observations 124 connected to each other by branches 126. As depicted, observations 124 are from observations 117. In the illustrative example, each tree in trees 122 includes observations 124 that are connected to each other by branches 126. Observations 124 have scores 128 such that each observation in observations 124 has a score.

As depicted, trees 122 represent tracks 108. In the illustrative example, trees 122 are processed to identify tracks 108 for targets 104 with a desired level of accuracy. Without processing, trees 122 may not identify tracks 108 as accurately as desired.

Track generation system 112 identifies selected track 130 in tree 132 within trees 122 with observation 134 having highest score 136. In this illustrative example, selected track 130 in tree 132 is identified by a sequence of branches 126 in trees 122.

In the illustrative example, track generation system 112 adds a group of branches 126 to selected track 130 from other trees in trees 122 other than tree 132 having selected track 130. This process may be performed to identify additional tracks in tracks 108. Tracking targets 104 may be performed by track generation system 112.

In this manner, track generation system 112 may reduce processing resources used to identify track 118. As a result, real-time or near real-time tracking of targets 104 may be performed.

Track generation system 112 may be implemented in software, hardware, firmware or a combination thereof. When software is used, the operations performed by track generation system 112 may be implemented in program code configured to run on hardware, such as a processor unit. When firmware is used, the operations performed by track generation system 112 may be implemented in program code and data and stored in persistent memory to run on a processor unit. When hardware is employed, the hardware may include circuits that operate to perform the operations in track generation system 112.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, track generation system 112 may be implemented in computer system 138. Computer system 138 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

With the identification of track 118, track generation system 112 may perform action 140. In this illustrative example, action 140 may be selected from one of generating an alert, generating a warning, sending a message, displaying an indicator on a display system, displaying an indicator identifying a location of target 120 and showing track 118, identifying target 120, or other suitable actions.

In another illustrative example, action 140 may be performed by an operator. For example, a human operator may send instructions to intercept target 120, perform further surveillance of target 120, send instructions to ground forces, or other suitable actions.

As a result, computer system 138 operates as a special purpose computer system in which track generation system 112 in computer system 138 enables real-time or near real-time tracking of targets 104. In particular, track generation system 112 transforms computer system 138 into a special purpose computer system as compared to currently available general computer systems that do not have track generation system 112.

Figure 2:
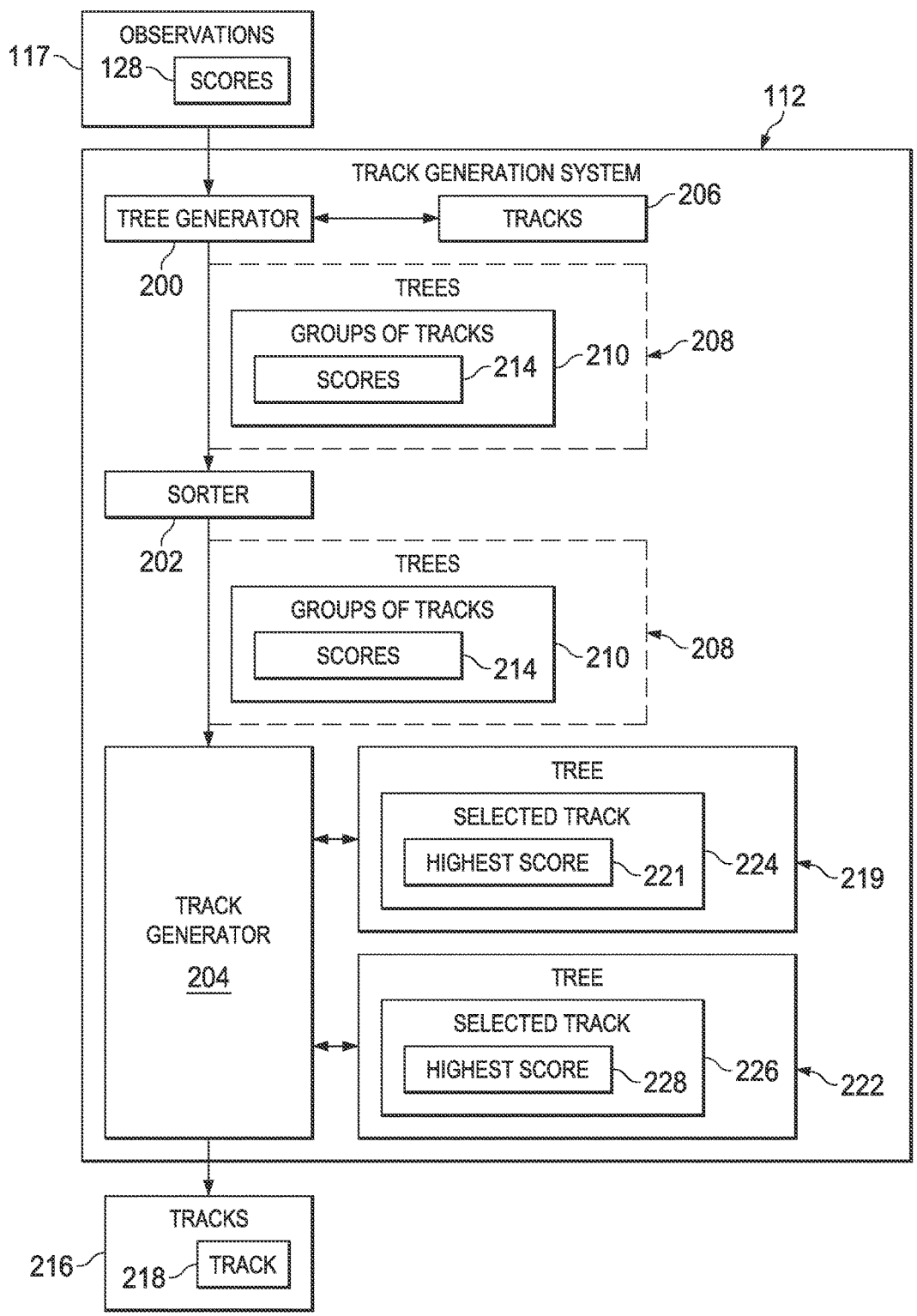
FIG. 2 is an illustration of a block diagram of data flow in generating tracks in accordance with an illustrative embodiment.

With reference next to FIG. 2, an illustration of a block diagram of data flow in generating tracks is depicted in accordance with an illustrative embodiment. In this figure, an example of data flow used to identify tracks 108 for targets 104 is shown. In this illustrative example, track generation system 112 includes tree generator 200, sorter 202, and track generator 204.

As depicted, tree generator 200 receives observations 117. Tree generator 200 identifies tracks 206 from observations 117. Tracks 206 include groupings of observations 117. As depicted, a grouping of observations is a sequence of observations. In this example, each track in tracks 206 is a sequence of observations. Each track in tracks 206 is different than the other tracks in tracks 206.

For example, tracks 206 may include valid groupings of observations 117. A track with a valid grouping of observations may be referred to as a potential track. In the illustrative example, a valid grouping is a grouping of observations for a track in which the observations in the grouping are not in conflict with each other.

A conflict between two observations in a grouping for a track occurs when the two observations in the grouping are incompatible with each other for the track. For example, if two observations were made at the same time but at different locations, these two observations may not be placed into a grouping of observations for a track. These two observations would indicate that the target of the track was in two locations at the same time if placed into the same grouping. This type of grouping is not valid. As another example, if only one observation is present at a location and two targets have a track that leads to the location, the observation only belongs to one target.

Tree generator 200 generates trees 208 from groups of tracks in tracks 206 that have the same first observation. This first observation of a track is the observation at the beginning of the track. As depicted, each tree in trees 208 includes a group of tracks in groups of tracks 210 that have the same first observation.

In the illustrative example, tree generator 200 calculates scores 214 for each observation in each track in groups of tracks 210. The score for an observation in a sequence of observations is the likelihood that the portion of observations in the sequence of operations, up to and including the observation, is correct. Scores 214 may be cumulative scores. The score for a track in a tree is the score for the last observation in the sequence of observations in the track.

Tree generator 200 calculates scores 214 based on observations 117. For example, tree generator 200 may calculate scores 214 using at least one of a log likelihood ratio method, or other suitable techniques for calculating scores for observations in a track. This log likelihood ratio method is a cumulative scoring technique.

In this illustrative example, when scores 214 are calculated using a cumulative scoring technique, scores 214 at time k may be cumulative scores. The log likelihood score at time k is the cumulative score at time k when the log likelihood method is used. The log likelihood score at time k is calculated using the following equations:

$$L(0)=0$$

$$L(k)=L(k-1)+\Delta L(k)$$

$$\Delta L(k)=\ln(1-P_d), \text{ no observation update}$$

$$\Delta L(k)=\Delta L_U(k), \text{ with observation update} \quad (1)$$

where L is the log likelihood score at time k, $P_d$ is the expected probability of detection of target analysis system 102; "no observation update" is when an observation is not present at time k that is compatible with an observation at time k−1; and "with observation update" is when an observation is present at time k that is compatible with an observation at time k−1. When an observation is present at time k that is compatible with an observation at time k−1 that observation is a compatible observation.

In equation (1), $\Delta L_U$ is the likelihood ratio (LR) calculated using the following equation:

$$\Delta L_U = \Delta L_K + \Delta L_S \quad (2)$$

where $\Delta L_K$ is based on kinematic behavior of a track, and $\Delta L_S$ is based on signal features of the observation. The signal features of the observation are based on an analysis of frames 116.

This likelihood ratio is calculated using the following equation:

$$LR = \frac{P(D|H_1)P_0(H_1)}{P(D|H_0)P_0(H_0)} = \frac{P_T}{P_F} \quad (3)$$

where $P(D|H_1), P(D|H_0)$ is a probability density function evaluated with the received observations of a track under the assumption that the track is for the target; $P(D|H_1)$ represents a hypothesis is correct for a given observation D that the observation is for a target; and $P(D|H_0)$ represents a hypothesis is incorrect for a given observation D that the observation is for a target. When the hypothesis is incorrect, the observation is for a different target. $P_0(H_1), P_0(H_0)$ is the priori probability of the hypothesis.

In equation (2), $\Delta L_K$ is calculated using the following equation when a Gaussian distribution is present for a track being the correct track for a target:

$$\Delta L_K = \frac{P(D_K|H_1)}{P(D_K|H_0)} = \ln\left[\frac{P_d}{\beta_{FT}(2\pi)\sqrt{\det(S)}}\right] - \frac{d^2}{2} \quad (4)$$

where $\Delta L_K$ corresponds to the log likelihood score based on the kinematic of a track; $P_d$ is the expected probability of detection of target analysis system 102; $P(D_K|H_1)$ is a probability for a given observation at time K that the observation is for the target; $P(D_K|H_0)$ is a probability for a given observation at time K that the observation is not for the target; $\beta_{FT}$ is the density of incorrect observations of a target; and S is the residual covariance matrix.

In equation (4), S is calculated using the following equation:

$$S = HPH^T + R \quad (5)$$

where H is the measurement output matrix, P is the state covariance matrix of the Kalman filter, R is the measurement covariance matrix of the Kalman Filter, and S is the residual covariance matrix:

$$d^2 = \tilde{y}^T S^{-1} \tilde{y} \quad (6)$$

where $d^2$ is a normalized statistical distance, and y is a measurement position.

Referring back to (2), $\Delta L_S$ is calculated using the following equation:

$$\Delta L_S(y) = \ln\left(\frac{P(y|H_1)}{P(y|H_0)}\right) \quad (7)$$

where $P(y|H_1)$ is a probability that a given expected measurement is for a target and $P(y|H_0)$ is a probability that a given expected measurement is not for a target. When the probability that a target is present follows a Gaussian distribution with mean SNR ($\mu_S$) and unit variance, the following equation is used to calculate $\Delta L_S(y)$:

$$\Delta L_S(y) = \ln\left(\frac{P(y|H_1)}{P(y|H_0)}\right) \quad (8)$$

$$= \ln\left(\frac{\exp\left[-\frac{(y-\mu_S)^2}{2}\right]/(\sqrt{2\pi})}{\exp\left[\frac{-y^2}{2}\right]/(\sqrt{2\pi})}\right)$$

$$= \mu_S\left(y - \frac{\mu_S}{2}\right)$$

Sorter 202 sorts trees 208 received from tree generator 200. As depicted, sorter 202 sorts trees 208 and places trees 208 into an order based on scores 214. In this illustrative example, sorter 202 sorts trees 208 based on a highest score for an observation in each tree. Sorter 202 also sorts each group of tracks in groups of tracks 210 in each tree in trees 208 based on scores 214. In this illustrative example, sorter 202 sorts a group of tracks in a tree by sorting the branches of the tree based on highest scores for observations in each branch.

For example, sorter 202 may sort trees 208 first, and then sort each group of tracks in each tree. Sorter 202 also may sort each group of tracks in each tree first, and then sort trees 208. Sorter 202 further may use multiple processing units to sort trees 208 and each group of tracks in each tree in parallel.

Track generator 204 generates tracks 216 from trees 208 received from sorter 202. In this illustrative example, track generator 204 generates track 218 in tracks 216 by first identifying tree 219 in trees 208 as the tree in trees 208 with highest score 221 in scores 214. In this illustrative example, because sorter 202 has already sorted trees 208, tree 219 is the first tree in trees 208.

As depicted, track generator 204 identifies selected track 224 as the track in tree 219 with highest score 221 in scores 214 for tree 219. In this illustrative example, selected track 224 is the first track in tree 219 because sorter 202 has already sorted the tracks in tree 219. Track generator 204 generates track 218 based on selected track 224 in tree 219. For example, track 218 may be a copy of selected track 224.

Track generator 204 then iterates through any remaining trees in trees 208 to identify tree 222 in trees 208 with selected track 226 that is compatible with track 218. A first track is compatible with a second track when an observation at one end of the first track is the same observation as the observation at another end of the second track.

As depicted, track generator 204 identifies selected track 226 as the track in tree 222 with highest score 228 in scores 214 for tree 222. In this illustrative example, selected track 226 is the first track in tree 222 because sorter 202 has already sorted the tracks in tree 222. Track generator 204 then adds branches from selected track 226 to track 218.

In this illustrative example, track generator 204 generates track 218 by combining selected track 224 in tree 219 and selected track 226 in tree 222. Track generator 204 may also add other compatible tracks from remaining trees in trees 208.

In this illustrative example, track generator 204 marks tree 219 and tree 222 as trees used to generate track 218. Trees marked as being used to generate a track are not used to generate any subsequent tracks. For example, instead of marking tree 219 and tree 222, track generator 204 may remove tree 219 and tree 222 from trees 208 before generating additional tracks in tracks 216.

Track generator 204 then repeats the process for generating track 218 to generate additional tracks in tracks 216. In this illustrative example, track generator 204 only adds a track to tracks 216 when the track meets a desired score for tracks in tracks 216.

The desired score may be set at different amounts depending on the particular implementation. Factors used to set the desired score include at least one of a desire to modify an amount of resource use, a desire to reduce false positive identifications of tracks, a desire to improve tracks that meet or exceed the desired score, or some other suitable factors.

Thus, track generation system 112 generates tracks 216 in linear time with respect to observations 117 of targets 104. Tracks 216 may be a hypothesis. The process described in this figure is a score-based prioritization hypothesis formation (SPHF) algorithm. Thus, track generation system one 112 may solve the problem with tracking objects using multiple hypothesis tracking processes in real world situations.

The illustration of the target tracking environment 100 and the different components in this environment in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In another illustrative example, detector 111 may be located in computer system 138 in FIG. 1. In another illustrative example, sensor system 110 may be omitted from target analysis system 102.

In still another illustrative example, target analysis system 102 may be associated with a platform. For example, target analysis system 102 may be associated with a platform selected from one of a mobile platform, a stationary platform, a land-based structure, an aquatic-based structure, and a space-based structure. More specifically, the platform may be an aircraft, a surface ship, a tank, a personnel carrier, a train, a spacecraft, a space station, a satellite, a submarine, an automobile, a building, or other suitable platforms.

As another example, sorter 202 may generate groups of trees from trees 208 where each tree in a group of trees has at least one observation that is also in another tree in the group of trees. In this illustrative example, sorter 202 adds to each group of trees in the groups of trees any tree in trees 208 that has at least one observation that is also in another tree in the group of trees.

As depicted, sorter 202 removes from each group of trees in the groups of trees any undesired trees in the group of trees. An undesired tree in the group of trees is a tree that does not have an observation that is located in another tree in the group of trees. In other words, the observations located in other trees in the group of trees are absent from the undesired tree. A group of trees with no undesired trees is a cluster of trees.

In this example, track generator 204 generates tracks 216 from the groups of trees. For example, track generator 204 may generate tracks 216 by starting with the group of trees in the groups of trees having the observation with the highest score.

FIGS. 3-7 illustrate observations in a sequence of frames for a portion of area 106. The sequence of frames is generated over a period of time. The observations shown in these frames are used to identify tracks 108 for targets 104 in FIG. 1.

Figure 3:
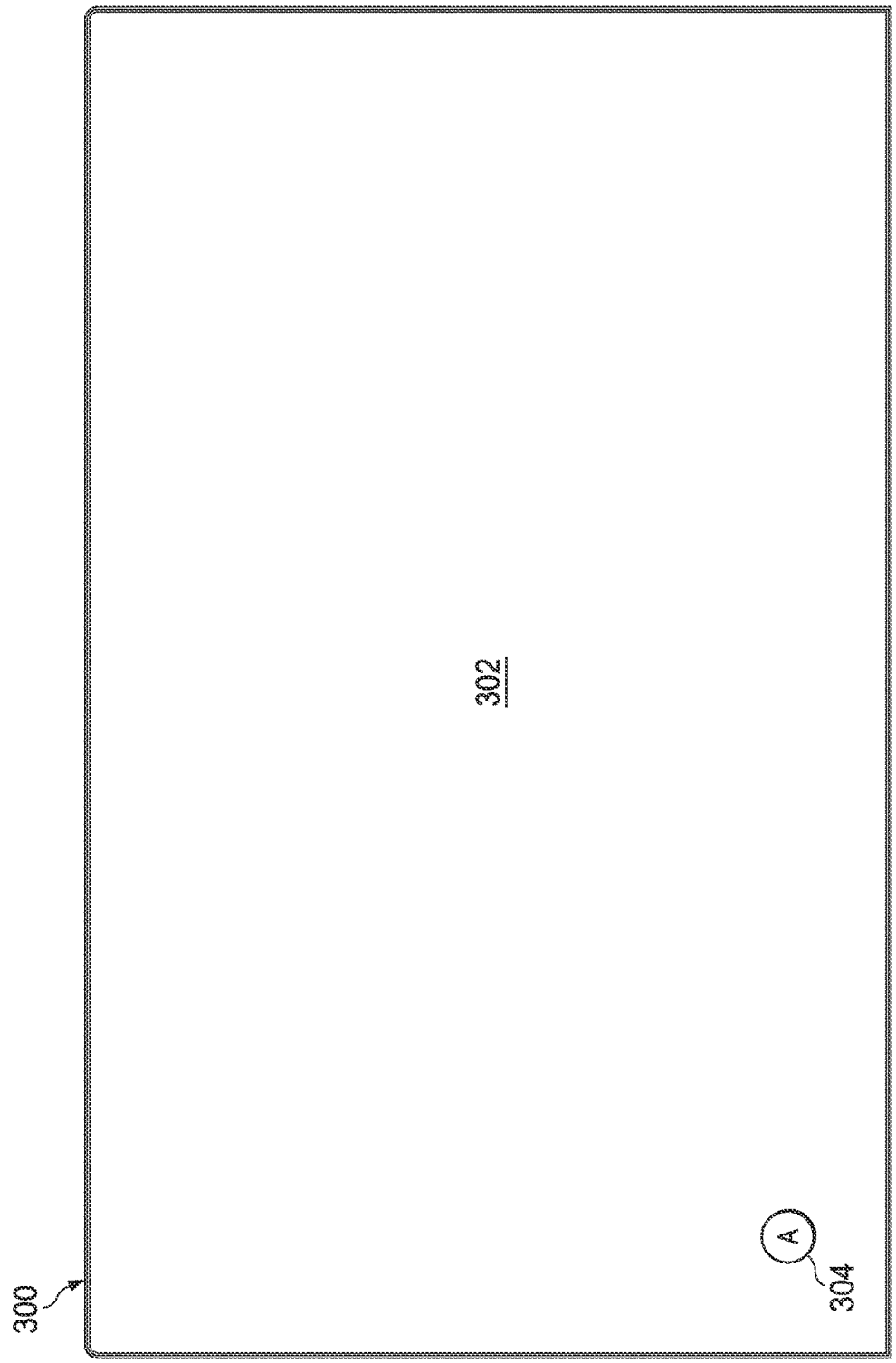
FIG. 3 is an illustration of an observation shown on frame 300 that is used to identify tracks for targets in accordance with an illustrative embodiment.

Turning next to FIG. 3, an illustration of an observation is depicted in accordance with an illustrative embodiment. In this figure, frame 300 is an example of a frame in frames 116 shown in block diagram form in FIG. 1. Frame 300 shows pixels in an image taken for portion 302 of area 106.

As depicted, observation 304 is shown on frame 300. Observation 304 is an example of an observation used to identify tracks 108 for targets 104.

Figure 4:
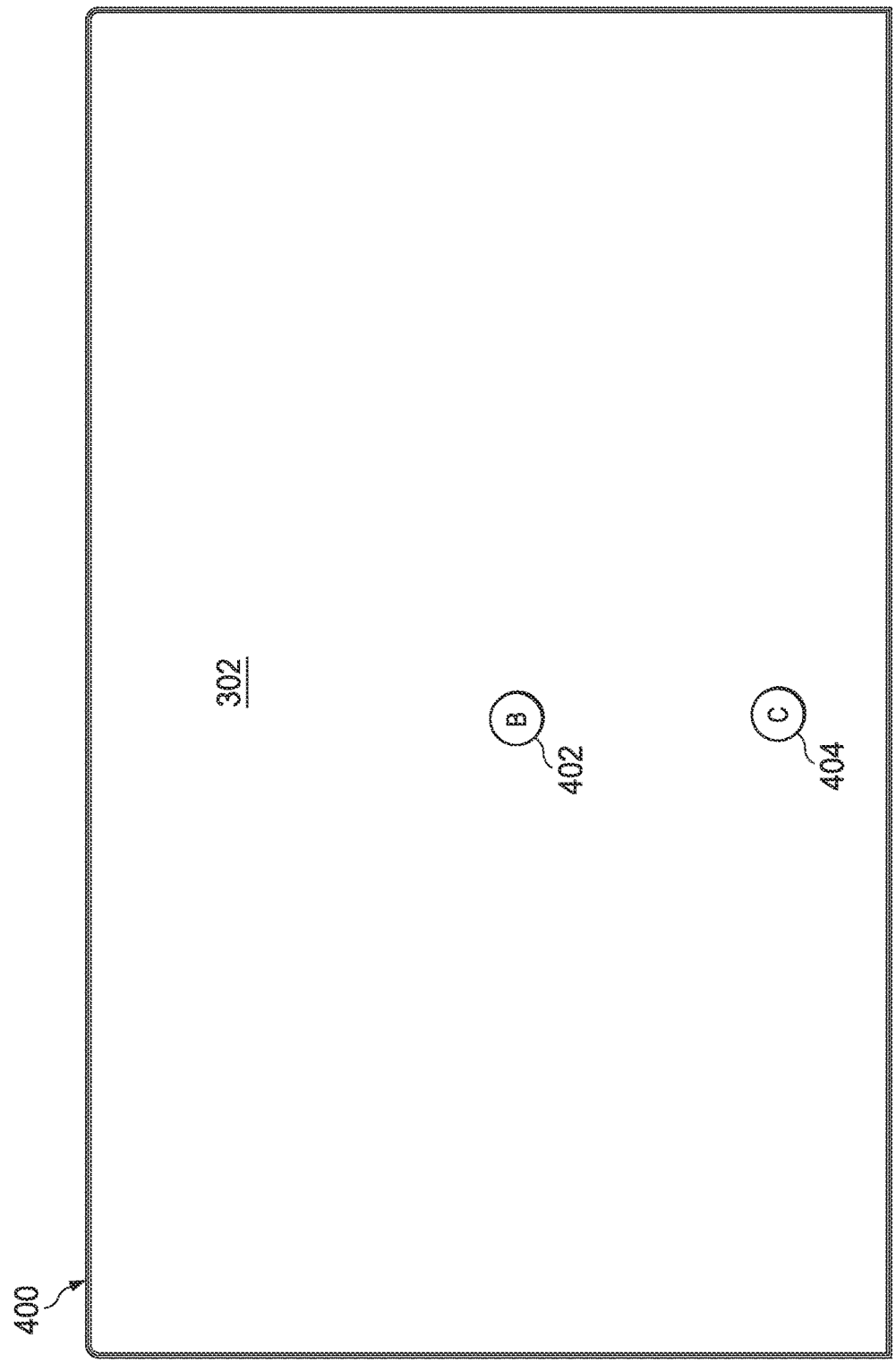
FIG. 4 is an illustration of two observations shown on frame 400 that is generated at a later point in time from frame 300 in FIG. 3 and used to identify tracks for targets in accordance with an illustrative embodiment.

Turning now to FIG. 4, an illustration of observations is depicted in accordance with an illustrative embodiment. In this illustrative example, frame 400 is an example of a frame in frames 116 shown in block diagram form in FIG. 1.

In this depicted example, frame 400 is generated at a later point in time from frame 300 in FIG. 3. As depicted, observation 402 and observation 404 are shown on frame 400.

Figure 5:
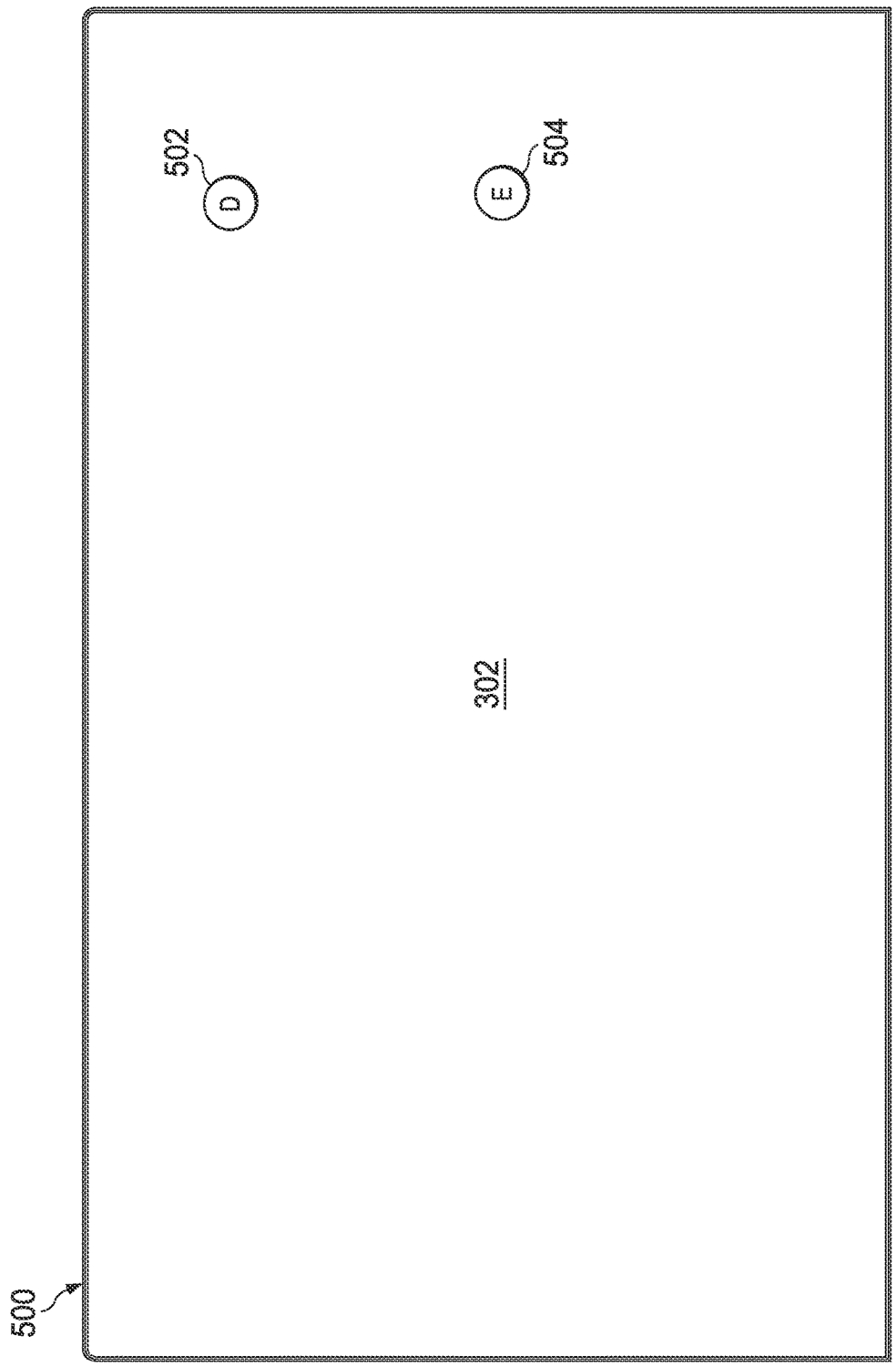
FIG. 5 is another illustration of two observations shown on frame 500 that is used to identify tracks for targets in accordance with an illustrative embodiment.

In FIG. 5, another illustration of observations is depicted in accordance with an illustrative embodiment. In this figure, another example of observations used to identify tracks 108 for targets 104 is shown. Frame 500 is an example of a frame in frames 116 shown in block diagram form in FIG. 1. Frame 500 shows pixels in an image taken for portion 302 of area 106.

In this illustrative example, frame 500 is generated at a later point in time from frame 400 in FIG. 4. Observation 502 and observation 504 are shown on frame 500. These observations are also examples of observations used to identify tracks 108 for targets 104.

Figure 6:
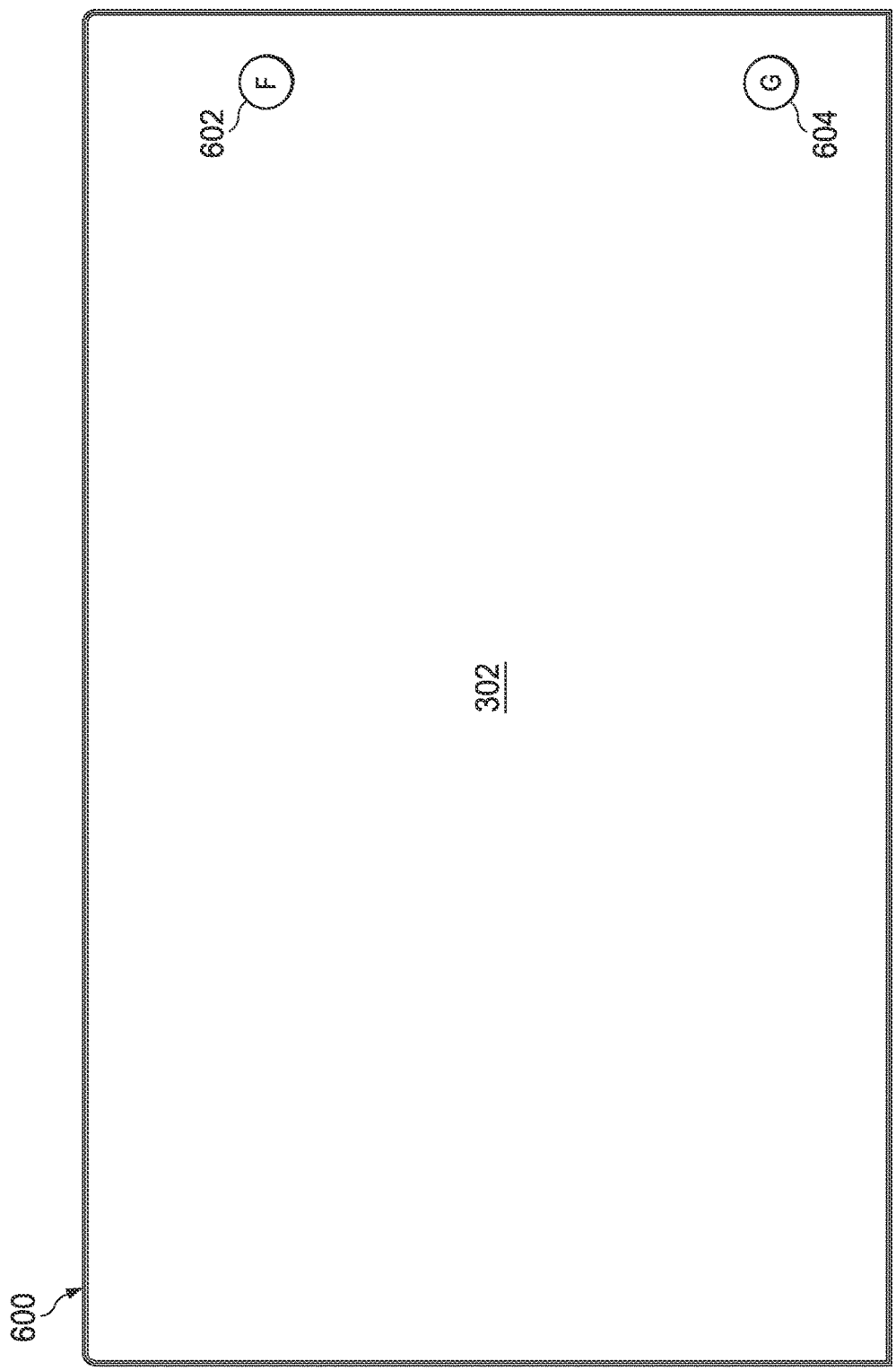
FIG. 6 is another illustration of two observations shown on frame 600 that is generated at a later point in time from frame 500 in FIG. 5 and used to identify tracks for targets in accordance with an illustrative embodiment.

With reference now to FIG. 6, another illustration of observations is depicted in accordance with an illustrative embodiment. In this figure, a further example of observations used to identify tracks 108 for targets 104 is shown.

Frame 600 is another example of a frame in frames 116 shown in block diagram form in FIG. 1. Frame 600 shows pixels in an image taken for portion 302 of area 106.

In this depicted example, frame 600 is generated at a later point in time from frame 500 in FIG. 5. As depicted, observation 602 and observation 604 are shown on frame 600. These observations are further examples of observations used to identify tracks 108 for targets 104.

Figure 7:
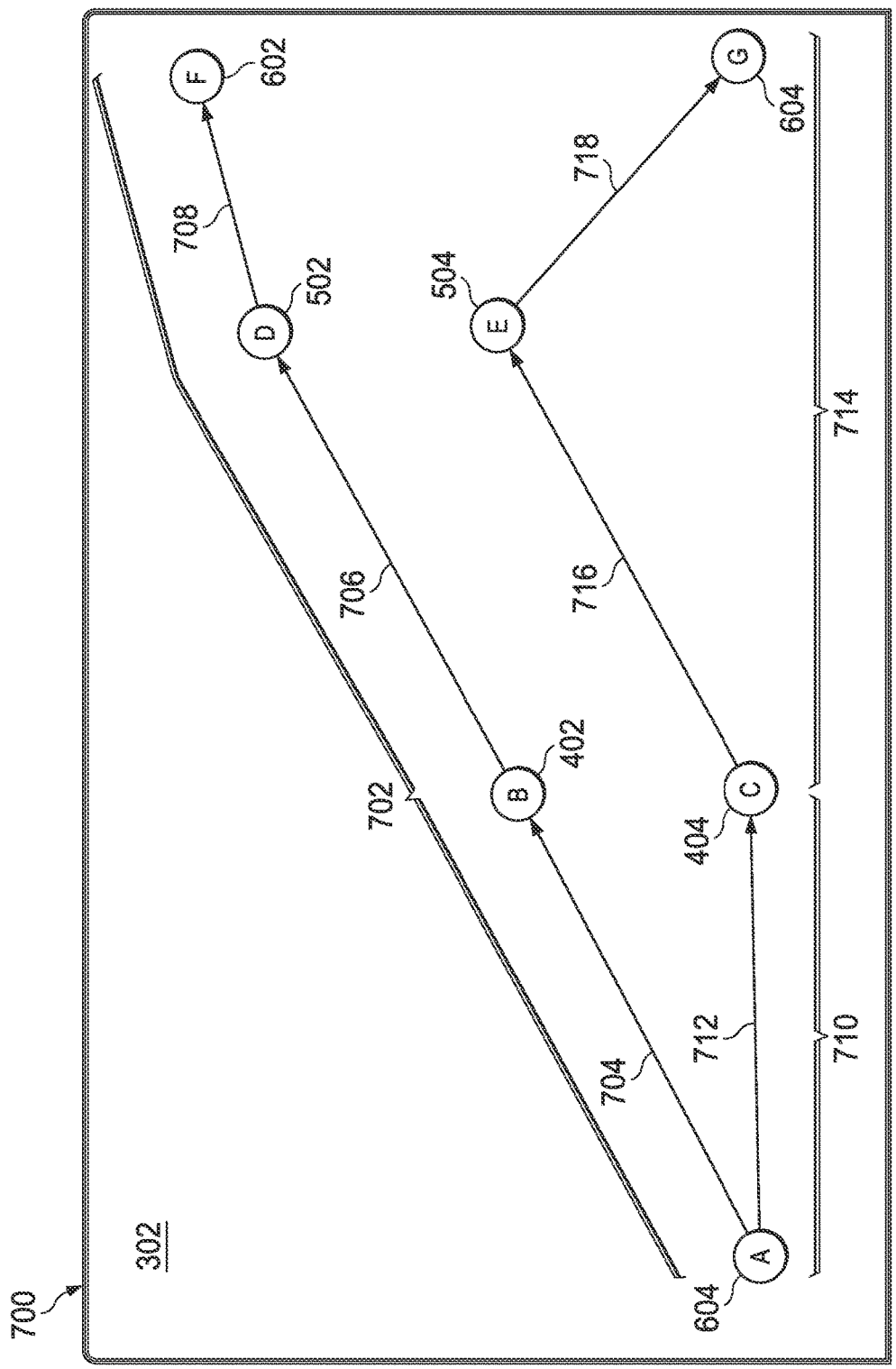
FIG. 7 is an illustration of potential tracks for targets in accordance with an illustrative embodiment.

With reference next to FIG. 7, an illustration of potential tracks for targets is depicted in accordance with an illustrative embodiment. Chart 700 is generated from frame 300 in FIG. 3, frame 400 in FIG. 4, frame 500 in FIG. 5, and frame 600 in FIG. 6.

In this figure, chart 700 illustrates branches connecting observations. These connections of observations by branches form potential tracks for targets 104.

As depicted, the observations from the sequence of frame 300, frame 400, frame 500, and frame 600 are illustrated. As depicted, chart 700 shows observation 304 from frame 300; observation 402 and observation 404 from frame 400; observation 502 and observation 504 from frame 500; and observation 602 and observation 604 from frame 600 for portion 302 of area 106. The observations from the sequence of frames are shown combined for the illustrative purpose of showing the example of branches connecting observations to form potential tracks for targets 104.

As depicted, potential track 702 includes branch 704 connecting observation 304 and observation 402; branch 706 connecting observation 402 and observation 502; and branch 708 connecting observation 502 and observation 602. Potential track 710 includes branch 712 connecting observation 304 and observation 404.

In this illustrative example, potential track 702 and potential track 710 both include observation 304. In this example, only one of these tracks may be a correct track for this target because these tracks both include the same observation. Further, only one of these tracks can be the correct track because the target identified in observation 304 on frame 300 can only be in one of observation 402 or observation 404 in frame 400. Potential track 702 and potential track 710 potentially may not be tracks for the target identified in observation 304.

Potential track 714 includes branch 716 connecting observation 404 and observation 504; and branch 718 connecting observation 504 and observation 604. In this illustrative example, potential track 702 may be a first selected track for a first target and potential track 714 may be a second selected track for a second target. As depicted, potential track 714 is absent from potential track 702.

Figures 8, 9:
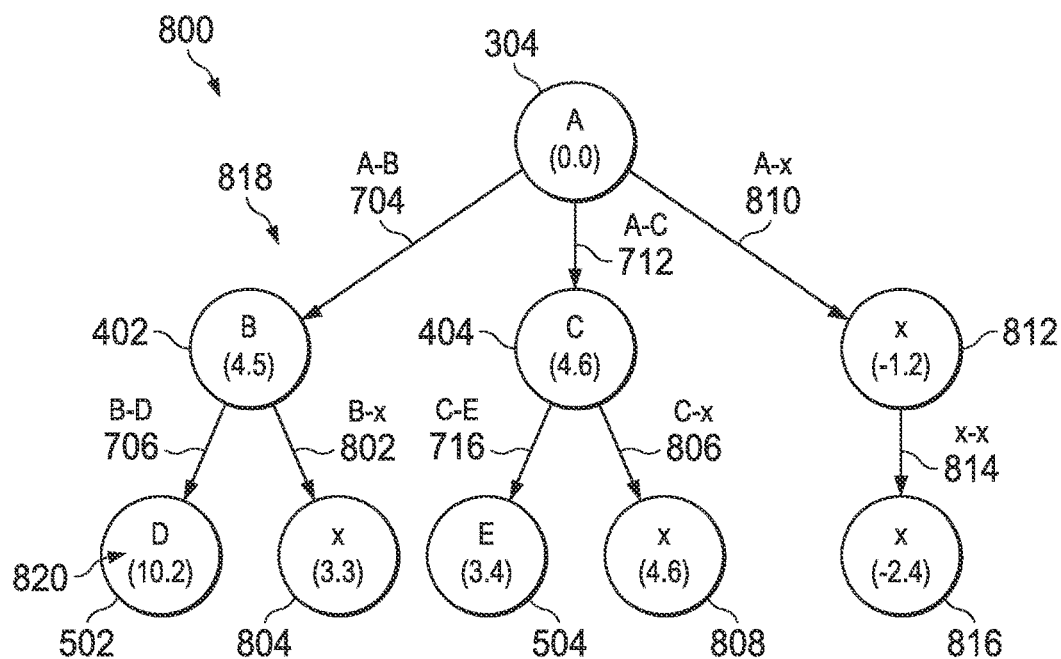
FIG. 8 is an illustration of a tree in accordance with an illustrative embodiment.
FIG. 9 is another illustration of a tree in accordance with an illustrative embodiment.

FIGS. 8-14 illustrate trees for the observations shown in FIGS. 3-6. The trees shown in these figures are examples of trees 122 shown in block diagram form in FIG. 1. Turning to FIG. 8, an illustration of a tree is depicted in accordance with an illustrative embodiment. In this figure, the root of tree 800 is observation 304 from FIG. 3.

As depicted, tree 800 includes branch 704 connecting observation 304 and observation 402; branch 706 connecting observation 402 and observation 502; branch 802 connecting observation 402 and observation 804; branch 712 connecting observation 304 and observation 404; branch 716 connecting observation 404 and observation 504; branch 806 connecting observation 404 and observation 808; branch 810 connecting observation 304 and observation 812; and branch 814 connecting observation 812 and observation 816.

Observation 804 is generated for tree 800 based on the likelihood that a compatible observation is absent from frame 500 for branch 802. Observation 808 is generated for tree 800 based on the likelihood that a compatible observation is absent from frame 500 for branch 806. Observation 812 is generated for tree 800 based on the likelihood that a compatible observation is absent from frame 400 for branch 810. Observation 816 is generated for tree 800 based on the likelihood that a compatible observation is absent from frame 500 for branch 814.

In this illustrative example, scores 818 shown for observations in tree 800 are examples of scores 214 shown in block form in FIG. 2. For example, highest score 820 is an example of highest score 221 shown in block form in FIG. 2. In this example, highest score 820 has the value "10.2."

Turning to FIG. 9, another illustration of a tree is depicted in accordance with an illustrative embodiment. In this figure, the root of tree 900 is observation 404 from FIG. 4.

As depicted, tree 900 includes branch 716 connecting observation 404 and observation 504; branch 718 connecting observation 504 and observation 604; branch 902 connecting observation 504 and observation 904; branch 906 connecting observation 404 and observation 908; and branch 910 connecting observation 908 and observation 912.

Observation 904 is generated for tree 900 based on the likelihood that a compatible observation is absent from frame 600 for branch 902. Observation 908 is generated for tree 900 based on the likelihood that a compatible observation is absent from frame 500 for branch 906. Observation 912 is generated for tree 900 based on the likelihood that a compatible observation is absent from frame 600 for branch 910.

Highest score 914 is an example of highest score 221 shown in block form in FIG. 2. In this example, highest score 914 has the value "9.2."

Figure 10:
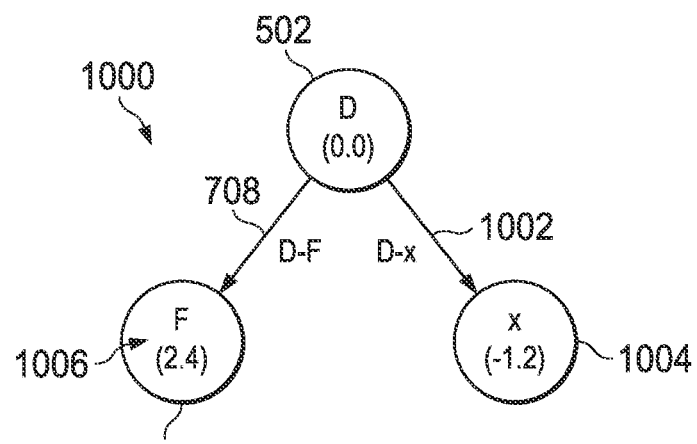
FIG. 10 is another illustration of a tree in accordance with an illustrative embodiment.

Turning next to FIG. 10, another illustration of a tree is depicted in accordance with an illustrative embodiment. In this figure, the root of tree 1000 is observation 502 from FIG. 5.

As depicted, tree 1000 includes branch 708 connecting observation 502 and observation 602; and branch 1002 connecting observation 502 and observation 1004. Observation 1004 is generated for tree 1000 based on the likelihood that a compatible observation is absent from frame 600 for branch 1002.

Highest score 1006 is an example of highest score 228 shown in block form in FIG. 2. In this example, highest score 1006 has the value "2.4."

Figure 11:
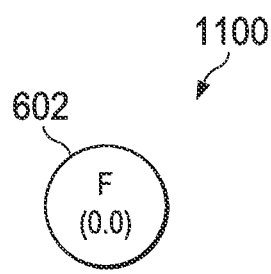
FIG. 11 is another illustration of a tree in accordance with an illustrative embodiment.

In FIG. 11, another illustration of a tree is depicted in accordance with an illustrative embodiment. In this figure, the root of tree 1100 is observation 602 from FIG. 6.

Figure 12:
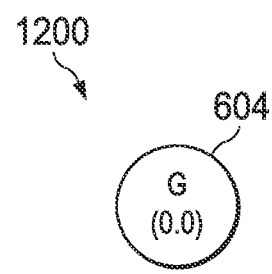
FIG. 12 is another illustration of a tree in accordance with an illustrative embodiment.

Referring now to FIG. 12, another illustration of a tree is depicted in accordance with an illustrative embodiment. In this figure, the root of tree 1200 is observation 604 from FIG. 6.

Figure 13:
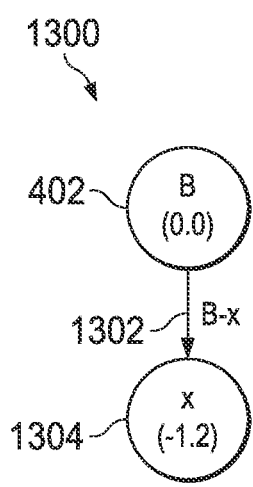
FIG. 13 is another illustration of a tree in accordance with an illustrative embodiment.

Referring next to FIG. 13, another illustration of a tree is depicted in accordance with an illustrative embodiment. In this figure, the root of tree 1300 is observation 402 from FIG. 4.

As depicted, tree 1300 includes branch 1302 connecting observation 402 and observation 1304. Observation 1304 is generated for tree 1300 based on the likelihood that a compatible observation is absent from frame 500 for branch 1302.

Figure 14:
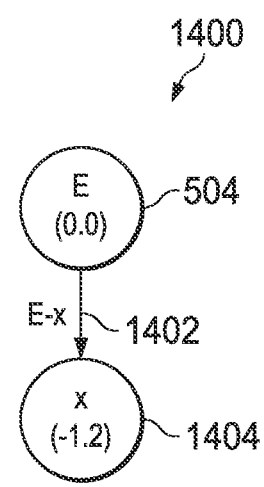
FIG. 14 is another illustration of a tree in accordance with an illustrative embodiment.

With reference next to FIG. 14, another illustration of a tree is depicted in accordance with an illustrative embodiment. In this figure, the root of tree 1400 is observation 504 from FIG. 5.

As depicted, tree 1400 includes branch 1402 connecting observation 504 and observation 1404. Observation 1404 is generated for tree 1400 based on the likelihood that a compatible observation is absent from frame 600 for branch 1402.

Figure 15:
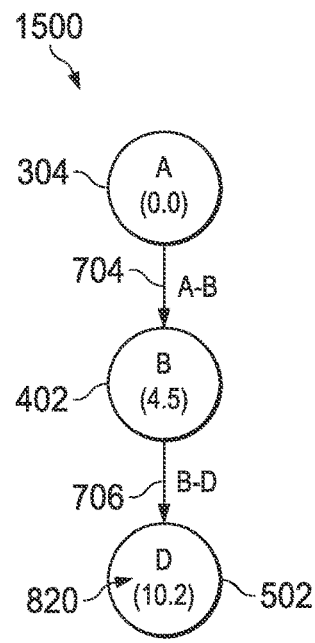
FIG. 15 is an illustration of a track selected by a track generation system from a tree in accordance with an illustrative embodiment.
Figure 16:
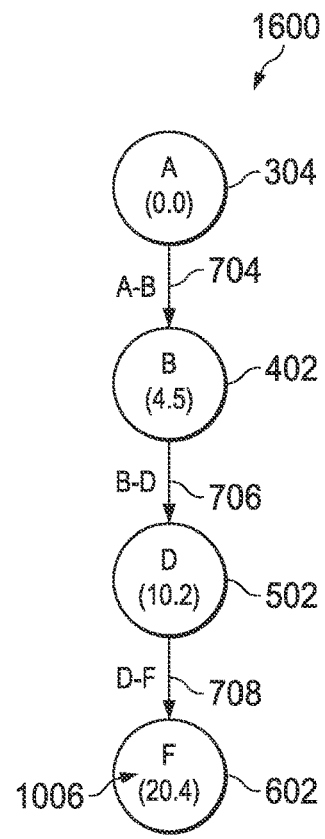
FIG. 16 is an illustration of adding a branch to a track in accordance with an illustrative embodiment.
Figure 17:
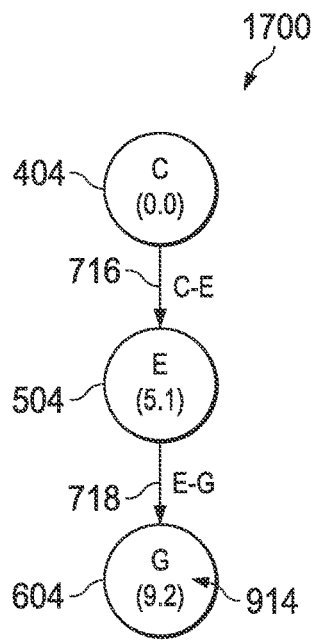
FIG. 17 is an illustration of a track selected from a tree in accordance with an illustrative embodiment.

FIGS. 15-17 illustrate tracks for targets identified from the trees shown on FIGS. 8-14. The tracks shown in these figures are examples of tracks 216 shown in block diagram form in FIG. 2.

Turning to FIG. 15, an illustration of a track selected by a track generation system from a tree is depicted in accordance with an illustrative embodiment. In this figure, track 1500 is selected because observation 502 is the observation with highest score 820 in tree 800 in FIG. 8.

In FIG. 16, an illustration of adding a branch to a track is depicted in accordance with an illustrative embodiment. In this figure, a track generation system adds branch 708 connecting observation 502 and observation 602 to track 1500.

Branch 708 is added to track 1500 because observation 502 at the beginning of branch 708 is also at the end of branch 706 in track 1500. Thus, branch 708 is compatible with branch 706. Additionally, branch 708 was selected over branch 1002 in tree 1000 in FIG. 10 because observation 602 has highest score 1006 in tree 1000.

With reference to FIG. 17, an illustration of a track selected from a tree is depicted in accordance with an illustrative embodiment. In this figure, a track generation system selects track 1700 after selecting track 1500. Track 1700 is selected because observation 604 is the observation with highest score 914 in tree 900.

Figure 18:
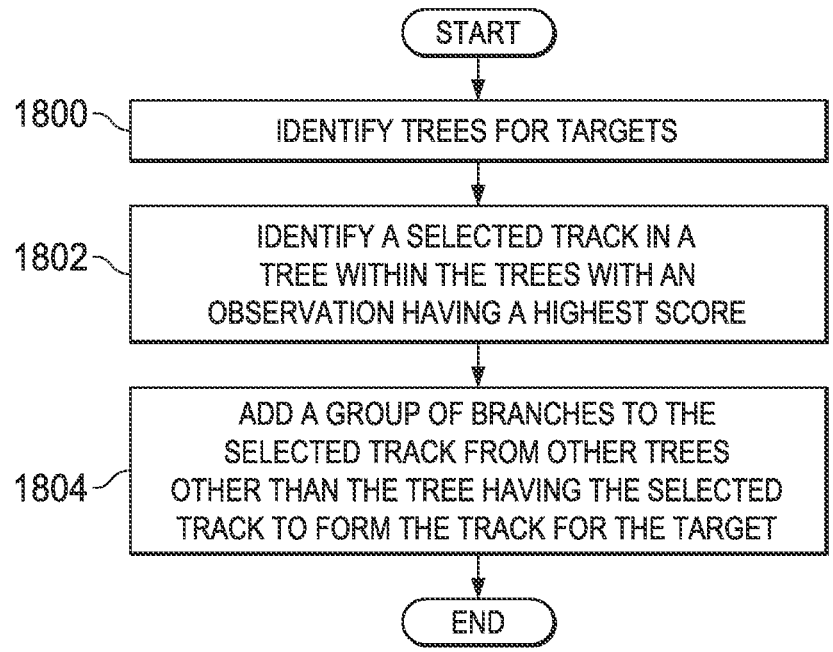
FIG. 18 is an illustration of a flowchart of a process for identifying a track for a target in accordance with an illustrative embodiment.

Turning next to FIG. 18, an illustration of a flowchart of a process for identifying a track for a target is depicted in accordance with an illustrative embodiment. The process in FIG. 18 may be implemented in target tracking environment 100 in FIG. 1. For example, the process may be implemented in track generation system 112 in target analysis system 102 in FIG. 1.

The process begins by identifying trees for targets (step 1800). Each tree includes observations that are connected to each other by branches, and each observation has a score. The process identifies a selected track in a tree within the trees with an observation having a highest score (step 1802). In this illustrative example, the highest score is at a tier farthest away from the root of the tree.

The process adds a group of branches to the selected track from other trees other than the tree having the selected track to form the track for the target (step 1804) with the process terminating thereafter. This process may be repeated any number of times for additional targets for which tracks are identified. In this manner, reducing processing resources used to identify the track is enabled.

Figure 19:
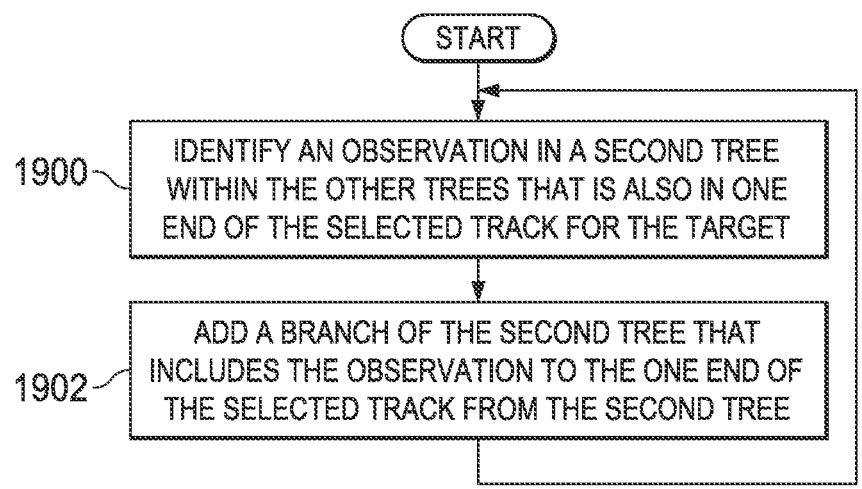
FIG. 19 is an illustration of a flowchart of a process for adding a branch to a tree from another tree is depicted in accordance with an illustrative embodiment.

With reference now to FIG. 19, an illustration of a flowchart of a process for adding a branch to a tree from another tree is depicted in accordance with an illustrative embodiment. The process illustrated in Figure is an example of an implementation for step 1804 in FIG. 18. In this example, the tree in FIG. 18 is a first tree.

The process begins by identifying an observation in a second tree within the other trees that is also in one end of the selected track for the target (step 1900). The one end of the selected track is at least one of the first observation in the track or the last observation in the track.

The process adds a branch of the second tree that includes the observation to the one end of the selected track from the second tree (step 1902). In step 1902, the addition of the branch is part of a process for forming the track for the target. The process repeats steps 1900 and 1902 until all branches within the other trees that can be added to the track have been added to the track.

Figure 20:
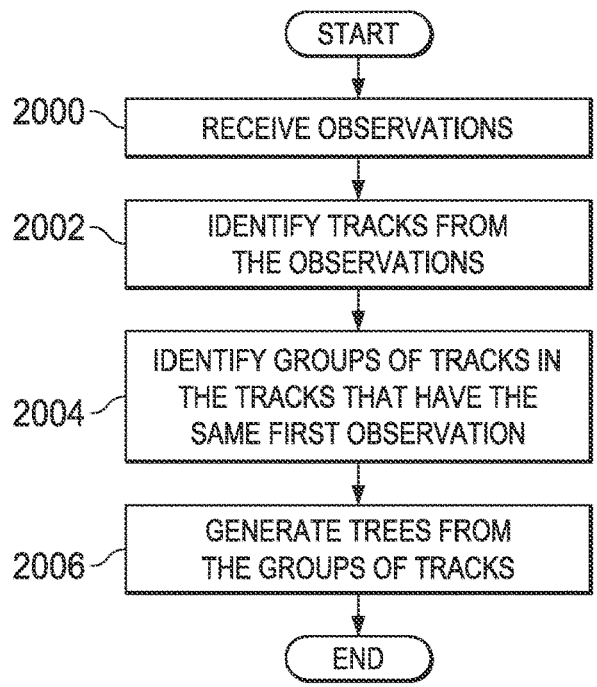
FIG. 20 is an illustration of a flowchart of a process for identifying trees in accordance with an illustrative embodiment.

With reference now to FIG. 20, an illustration of a flowchart of a process for identifying trees is depicted in accordance with an illustrative embodiment. The process illustrated in FIG. 20 is an example of an implementation for step 1800 in FIG. 18.

The process begins by receiving observations (step 2000). The process identifies tracks from the observations (step 2002). The tracks identified in step 2002 are an example of tracks 206 in FIG. 2.

The process next identifies groups of tracks in the tracks that have the same first observation (step 2004). The process then generates trees from the groups of tracks (step 2006) with the process terminating thereafter.

Figure 21:
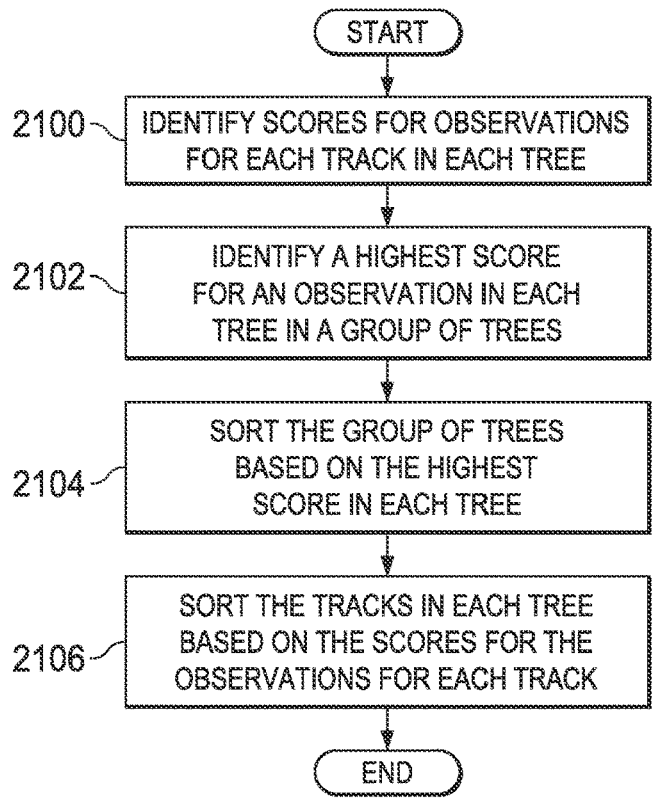
FIG. 21 is an illustration of a flowchart of a process for sorting trees in accordance with an illustrative embodiment.

With reference now to FIG. 21, an illustration of a flowchart of a process for sorting trees is depicted in accordance with an illustrative embodiment. The process illustrated in FIG. 21 is an example of steps that may take place before step 1802 in FIG. 18.

The process begins by identifying scores for observations for each track in each tree (step 2100). The process identifies a highest score for an observation in each tree in a group of trees (step 2102). The process sorts the group of trees based on the highest score in each tree (step 2104). The process sorts the tracks in each tree based on the scores for the observations for each track (step 2106) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 22:
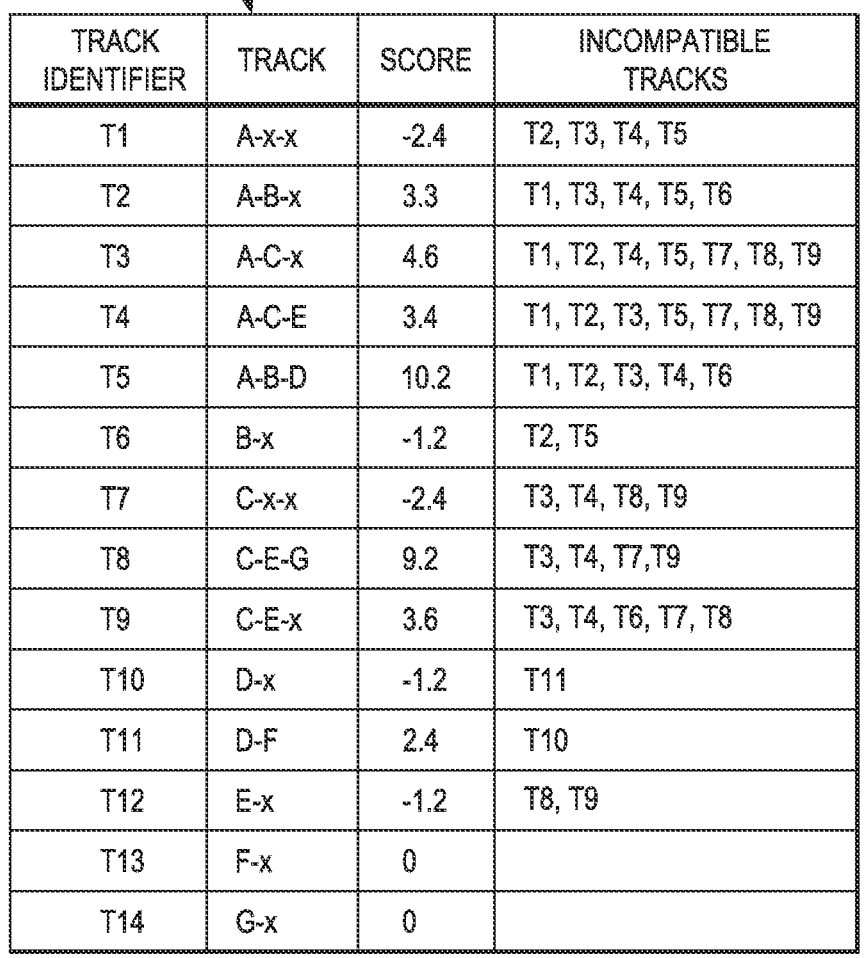
FIG. 22 is an illustration of a table of information about tracks in accordance with an illustrative embodiment.

With reference next to FIG. 22, an illustration of a table of information about tracks is depicted in accordance with an illustrative embodiment. In this figure, table 2200 includes columns for track identifiers, tracks, scores, and groups of incompatible tracks. The rows in table 2200 include tracks from tree 800, tree 900, tree 1000, tree 1100, tree 1200, tree 1300, and tree 1400 shown in FIGS. 8-14.

In this illustrative example, a group of incompatible tracks for a track is a group of track identifiers for tracks that are incompatible with the track. As depicted, track "T1" is incompatible with track "T2", track "T3", track "T4", and track "T5" because these tracks are all from tree 800 and observation "A" can only be in one of these tracks.

With reference now to FIG. 23, an illustration of pseudo code for identifying a set of tracks is depicted in accordance with an illustrative embodiment. Pseudo code 2300 in FIG. 23 is an algorithm for processing groups of trees to identify a set of tracks for each group of trees in the groups of trees.

Pseudo code 2300 may be implemented in target tracking environment 100 in FIG. 1. For example, a process implementing the algorithm in pseudo code 2300 may be implemented in track generation system 112 in target analysis system 102 in FIG. 1.

In this illustrative example, the process performs the lines in pseudo code 2300 to identify the set of tracks for each group of trees in the groups of trees. The groups of trees are examples of groups of trees generated by sorter 202 from trees 208 where each tree in a group of trees has at least one observation that is also in another tree in the group of trees.

The process begins by identifying a group of trees in the group of trees that has not been processed (line 2304). The process marks the group of trees as visited to indicate the group of trees has been processed (line 2306). The process sets the number of tracks for this group of trees to 1; marks the trees in this group of trees as not visited; and marks each sequence of observations in these trees as not visited (line 2308).

The process identifies whether the number of tracks is less than some maximum number (line 2310). In this example, the maximum number is a limit to the number of tracks that may be detected in each group of trees.

As depicted, when the number of tracks is less than some maximum number, the process next identifies whether at least one tree in the group of trees has a sequence of observations that has not been visited (line 2312). As also depicted, when at least one tree in the group of trees has a sequence of observations that has not been visited, the process identifies whether at least one tree in the group of trees has not been visited (line 2314).

When the process identifies that at least one tree in the group of trees has not been visited, the process next identifies a tree that has not been visited in this group of trees (line 2316). The process then identifies a sequence of observations in this tree that has not been visited, has the highest cumulative score, and is compatible with track [number of tracks] (line 2318). Track[ ] is a set of tracks being generated for this group of trees. Track[number of tracks] is the track currently being generated for this group of trees.

As depicted, when the sequence of observations has been identified, the process adds the sequence of observations to track[number of tracks], and marks the sequence of observations as visited (line 2320). The process marks the tree as visited (line 2322) and goes back to line 2314.

Referring back to line 2314, when the process identifies that all trees are marked as visited, the process marks as not visited any trees in this group of trees that have a sequence of observations that has not been visited yet (line 2324) and goes back to line 2312.

Referring back to line 2312, when the process identifies that all trees are marked as visited, the process increments the number of tracks by one (line 2326) and goes back to line 2310.

Referring back to line 2310, when the process identifies that the number of tracks is greater than or equal to the maximum number (line 2328) the process goes back to line 2304. Referring back to line 2304, when the process identifies that each group of trees has been visited (line 2330) the process terminates thereafter.

Figure 24:
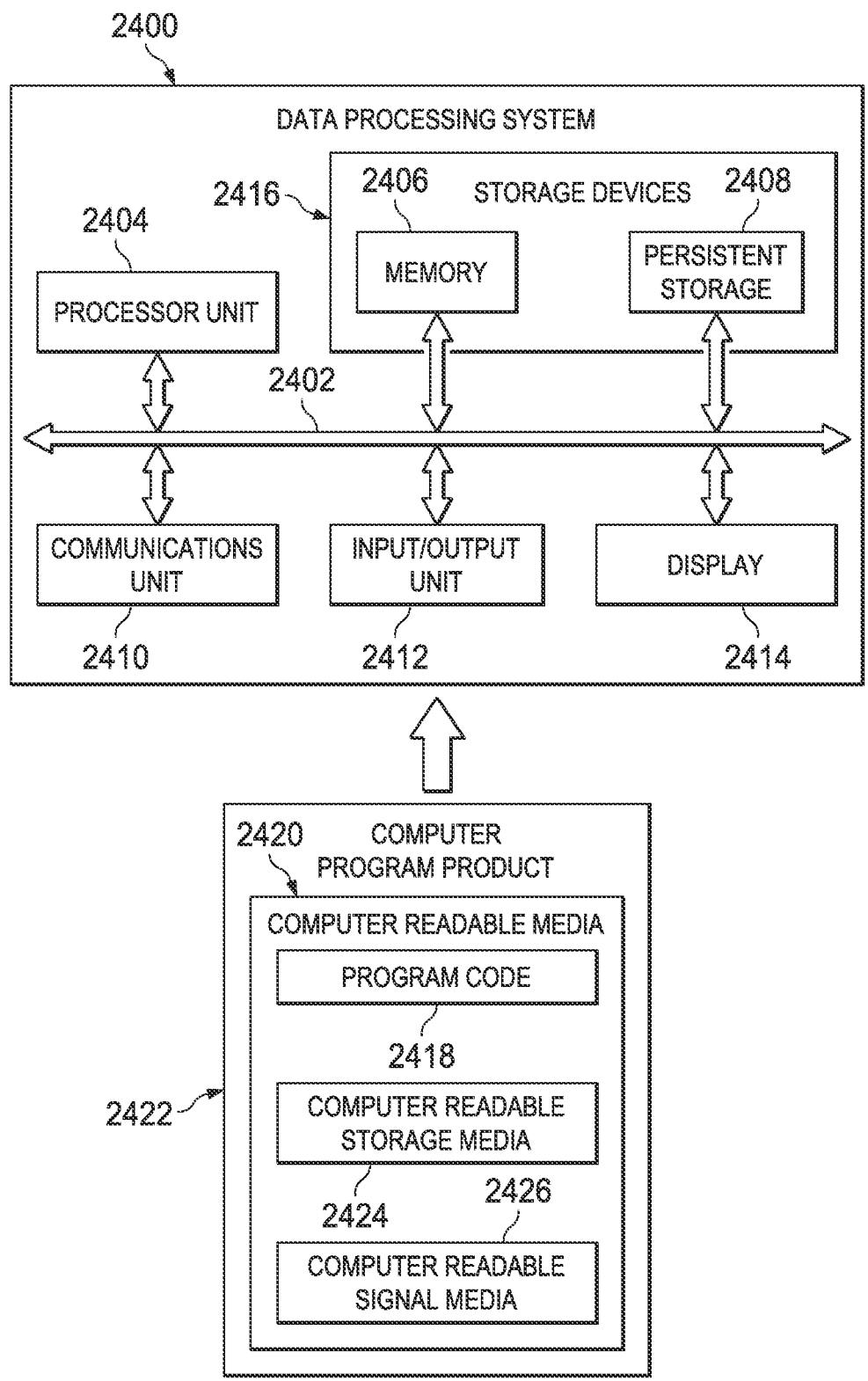
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 may be used to implement computer system 138 in FIG. 1. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

Thus, the illustrative embodiments provide a method and apparatus for identifying tracks for targets. In particular, one or more illustrative examples provide a solution to a technical problem involving tracking targets in real world situations. For example, a target tracking system may use a multiple hypothesis tracking process in a manner that reduces the complexity and processing resources needed to track targets. This reduction in the complexity, processing resources, or both has the effect of allowing for tracking targets in real-time or near real-time in real world situations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a track for a target, the method comprising:

generating images of an area using a sensor system;

identifying observations in the area by processing the images using a detector;

identifying trees for targets, wherein each tree in the trees includes the observations that are connected to each other by branches and each observation has a score;

identifying a selected track in a tree within the trees with an observation having a highest score;

adding a group of branches to the selected track from other trees other than the tree having the selected track to form a track for a target, enabling reducing processing resources used to identify the track;

wherein the track for the target is a first track for a first target, the selected track is a first selected track and further comprising:

identifying a second selected track for a second target in a tree within the trees with an observation with a highest score that is absent from the first track; and adding branches to the second selected track from other trees other than the tree having the second selected track to form a second track for the second target; and performing an action based on the second track, wherein the action displays an indicator on a display system identifying a location of the second target and showing the second track.

2. The method of claim 1, wherein the tree is a first tree and the adding step comprises:

identifying an observation in a second tree within the other trees that is also in one end of the first selected track for the target; and adding a branch of the second tree that includes the observation to the one end of the first selected track from the second tree to form the first track for the first target.

3. The method of claim 2, wherein the one end of the first selected track is at least one of an observation at an end of the first track or an observation at a start of the first track.

4. The method of claim 1 further comprising:

sorting the trees based on the highest score for an observation in each tree.

5. The method of claim 1 further comprising:

sorting the branches in the trees based on highest scores for the observations in each branch.

6. The method of claim 1, wherein the step of identifying the trees for the targets comprises:

removing an undesired tree from the trees, wherein an observation that is located in another tree in the trees is absent from the undesired tree; and performing the removing step until all undesired trees have been removed.

7. The method of claim 1 further comprising:

identifying the score for each observation in the trees based on an analysis of frames.

8. An apparatus comprising:

a sensor system, wherein the sensor system generates images of an area;

a detector, wherein the detector identifies observations in the area by processing the images; and a track generation system, wherein the track generation system:

identifies trees for targets, wherein each tree in the trees includes the observations that are connected to each other by branches and each observation has a score;

identifies a selected track in a tree within the trees with an observation having a highest score;

adds a group of branches to the selected track from other trees other than the tree having the selected track to form the track for a target, enabling reducing processing resources used to identify the track;

wherein the track for the target is a first track for a first target, the selected track is a first selected track and the track generation system:

identifies a second selected track for a second target in a tree within the trees with an observation with a highest score that is absent from the first track; and adds branches to the second selected track from other trees other than the tree having the second selected track to form a second track for the second target; and performs an action based on the second track, wherein the action displays an indicator on a display system identifying a location of the second target and showing the second track.

9. The apparatus of claim 8, wherein the tree is a first tree, and wherein in adding the group of branches to the first selected track from the other trees other than the tree having the first selected track to form the first track for the first target, the track generation system identifies an observation in a second tree within the other trees that is also in one end of the first selected track for the first target; and adds a branch of the second tree that includes the observation to the one end of the first selected track from the second tree to form the first track for the target.

10. The apparatus of claim 9, wherein the one end is at least one of an observation at an end of the first track or an observation at a start of the first track.

11. The apparatus of claim 8, wherein the track generation system sorts the trees based on the highest score for an observation in each tree.

12. The apparatus of claim 8, wherein the track generation system sorts the branches in the trees based on highest scores for observations in each branch.

13. The apparatus of claim 8, wherein in identifying the trees for the targets, the track generation system removes an undesired tree from the trees, wherein an observation that is located in another tree in the trees is absent from the undesired tree and performs the removing step until all undesired trees have been removed.

14. The apparatus of claim 8, wherein the track generation system identifies the score for each observation in the trees based on an analysis of frames.

15. A tracking system comprising:

a sensor system that generates images of an area;

a detector that identifies observations in the area by processing the images;

a tree generator that generates trees, wherein each tree in the trees includes the observations that are connected to each other by branches;

a sorter that receives the trees from the tree generator, sorts the trees based on scores for the observations, and sorts the branches in the trees based on the score for the observations; and a track generator that receives sorted trees, identifies a selected track in a tree within the sorted trees with an observation having a highest score, adds a group of branches to the selected track from other sorted trees other than the tree having the selected track to form a track for a target, enabling reducing processing resources used to identify the track;

wherein the track for the target is a first track for a first target, the selected track is a first selected track, and wherein the track generator:

identifies a second selected track for a second target in a tree within the trees with an observation with a highest score that is absent from the first track;

adds branches to the second selected track from other trees other than the tree having the second selected track to form a second track for the second target; and performs an action based on the second track, wherein the action displays an indicator on a display system identifying a location of the second target and showing the second track.

16. The tracking system of claim 15, wherein the tree is a first tree, and wherein in adding the group of branches to the first selected track from the other sorted trees other than the tree having the first selected track to form the first track for the first target comprises:

identifying an observation in a second tree within the other trees that is also in one end of the first selected track for the target; and adding a branch of the second tree that includes the observation to the one end of the first selected track from the second tree to form the first track for the first target.

17. The tracking system of claim 16, wherein the one end is at least one of an observation at an end of the first track or an observation at a start of the first track.

* * * * *